United States Patent [19]  
Diggs

[11] 4,013,382  
[45] Mar. 22, 1977

[54] WAVE POWER APPARATUS SUPPORTED AND OPERATED BY FLOATS IN WATER

[76] Inventor: Richard E. Diggs, S. 12A Road, P.O. Box 776, Carthage, Mo. 64836

[22] Filed: Oct. 14, 1975

[21] Appl. No.: 622,256

[52] U.S. Cl. .................................. 417/332; 60/398
[51] Int. Cl.² ........................................ F04B 17/00
[58] Field of Search .................. 417/332, 331, 334; 60/497, 500, 506, 501, 505, 398; 290/53, 42

[56] References Cited

UNITED STATES PATENTS

| 632,826 | 9/1899 | Rice | 417/332 |
|---|---|---|---|
| 1,244,309 | 10/1917 | Fox | 417/332 |
| 1,285,198 | 11/1918 | Irvine | 417/332 |
| 1,766,457 | 6/1930 | Ruth | 417/332 |
| 1,887,316 | 11/1932 | Lockfaw | 417/330 |
| 3,603,804 | 9/1971 | Caset | 417/332 |

Primary Examiner—Carlton R. Croyle
Assistant Examiner—Thomas I. Ross
Attorney, Agent, or Firm—Shoemaker and Mattare, Ltd.

[57] ABSTRACT

An apparatus for converting water wave movement into power. A float is located in a body of water, and the apparatus converts the up and down movement of that float caused by waves in the water to operate a pump to displace hydraulic fluid through a hydraulic pumping station which actuates fluid motors, or the like to produce power. The force of the float movement is multiplied by a mechanical advantage so that the pump displaces the hydraulic fluid on both the upward and downward movement of the float even in calm water. A plurality of modules are interconnected to take advantage of as much of a wave front as desired.

20 Claims, 11 Drawing Figures

WAVE POWER APPARATUS SUPPORTED AND OPERATED BY FLOATS IN WATER

BACKGROUND OF THE INVENTION

The present invention relates to power generators, and more particularly, to power generators using the action of water waves.

The ocean is a vast source of energy which goes virtually untapped. In particular, on an average day, thousands of waves move through any given unit area of ocean, and these waves represent a ready and almost limitless supply of energy if the ocean wave can be conveniently translated into usable power.

A prime difficulty with utilizing such wave energy as a power source is that, while an overall wave system may contain a vast amount of energy, each individual wave usually does not have a great deal of available energy. For example, a hectare of ocean may have waves representing an overall total power of many thousands of horsepower while each individual wave may represent only a few thousandths of horsepower. Thus, any mechanical energy transfer means which translates wave motion into usable power must either be extremely large to translate the total power of wave system into usable power, or be very efficient to make use of each individual wave to generate sufficient power to be usable. Therefore, such energy transfer devices can be conveniently catalogued into one of two catagories, large systems which translate a large portion of the total energy of the wave system into usable energy, or small systems which translate the wave energy in only small areas of a total wave system into usable power.

Each class of energy transfer device has its own advantages and disadvantages. For example, those devices falling into the large device catagory are susceptible to damage and/or breakup due to ocean storms or other high wind systems. The larger a device, the more susceptible it is to damage from wind currents or storms. Therefore, those devices falling into the small catagory have an advantage over the large devices by being less susceptible to damage or breakup due to wind currents.

However, those devices catagorized as small devices must make use of the available energy in each wave which is much more efficient than the use made of the energy made of each wave by the large devices.

Efficient usage of wave movement is the very problem which inhibits the wide acceptance of small devices. Due to the design and structure of known devices, the energy which is available in each wave is not efficiently utilized, and therefore, the power output of known devices does not reach a level which is suitable for useful application until the size of the known devices reaches a level approximately that of the large catagory. Therefore, the devices become susceptible to the abovediscussed disadvantages as well as other disadvantages, such as being unsightly and thus detracting from an otherwise scenic beach, or disturbing normal shipping lanes.

One presently known device comprises a plurality of serially connected piston pumps which pressurize a hydraulic fluid for use in a hydraulic energy plant. The pistons of the pumps are connected to floats which are placed in the ocean and which are then rocked by wave movements. The rocking motion of the floats reciprocates the pistons in the pumps to move the fluid through the system. However, each pump utilizes either, but not both, the upward or downward movement of the float resulting from wave motion. Hence, only half of the energy which is available in each wave is utilized to reciprocate the pumps of this system. Therefore, a great number of pumps are utilized to drive the fluid to the system with sufficient pressure to adequately operate the associated power plant. Furthermore, because each pump is driven only by the rocking motion of the floats, without any additional mechanical advantage to increase the pressure in the fluid, this system generally does not pressurize the fluid to a level which is high enough to be usable for large power requirements. To generate such power levels, this device will generally have to be quite large, and therefore, have the drawbacks of the so-called large devices.

Another known device uses first degree levers to reciprocate pumps in response to wave movement. Thus, a pump piston is attached to one end of a lever and a float is attached to the other end. Upward movement of the float causes downward movement of the pump piston to move fluid through the system to a fluid motor. The pumps are ganged together to make full use of a wave front. However, this device, like the device discussed above, utilizes wave movement in only one direction to reciprocate the pump. Thus, only upward movement of the float is utilized to drive fluid through the system. Therefore, even though long levers are used to produce large mechanical advantages, only part of the energy available from each wave is used, and the device must be quite large to produce power levels which are suitable for satisfying large requirements. Therefore, these devices must also be quite large, and hence fall into the so-called large catagory.

The device of the present invention utilizes all of the motion of a float which results from wave movement of reciprocate a pump, and hence makes full use of the available energy in each wave.

SUMMARY OF THE INVENTION

The device embodying the present invention utilizes both the upward and downward movement of a float resulting from the action of a wave passing through the water in which the float is located to operate a pump during both the upward and downward motion of that float. Fluid driven by the pump can then be used to drive a fluid motor, or the like.

A plurality of modules are interconnected to use as much of an ocean area as desired. Each module comprises a frame section which supports a plurality of pipes thereon and through which fluid flows to and from a power generating station. A double-acting pump is mounted on each frame section and is operated by a two-arm linkage mounted on the frame section. The pump is fluidly connected to the pipes and displaces fluid twice during each cycle to transfer fluid through those pipes. Operation of the linkage one way forces the piston downward to displace fluid to the pipes, and operation of the linkage in the other direction reciprocates the piston upwardly to displace fluid through the pipes. Thus, the linkage operated pump moves fluid in two strokes per cycle.

A connecting rod is mounted on each frame section and is attached at one end to one arm of the linkage and at the other end of a float. As the float rises and falls in response to wave movement, the connecting rod operates the linkage to reciprocate the pump. Thus, the pump is operated in response to both upward and downward movement of the float. A spring is mounted on each frame section and is connected to the connecting rod so that the movement of the float in one direction distorts the spring to store energy therein. Thus, the spring is biased to force the rod into the return movement, and the spring energy is utilized during that return movement to reciprocate the pump via the two-arm linkage. The lever arms and the connecting rod combine to produce a significant mechanical advantage so that even in calm water, the wave motion is strong enough to drive the pump and produce suitable system fluid flow.

Furthermore, the spring has a spring constant which is large enough to enable that spring to bias the connecting rod during both the upward and downward movement of the float so that the frame section can be supported by the floats.

The pipes of each section are connectable with each other so that any number of modules can be interconnected to build up a system of any suitable size. Furthermore, the frame sections are each triangular to provide sufficient strength to mount the equipment necessary to this system.

The modules are movably connected to the power station so that they can swing around the station into a position which makes use of the wave movement without subjecting the system to high stresses caused by wind forces crossing the device. Furthermore, the system is able to develop more power per square foot of ocean surface by working with the wind then it would at crosswind conditions.

As this system avoids sideloads, the danger of damage and/or breakup caused by high winds is reduced.

Therefore, a fluid is displaced by each pump on both an upward and a downward movement, a single wave is utilized twice and hence the maximum usage is made of each wave in a given wave front. Thus, usable power can be obtained by a device which is small relative to known devices.

Being small, the device embodying the present invention is not as subject to damage and/or breakup as are large devices, and can be placed at sea without endangering an aesthetic view or clogging shipping lanes.

Alternative embodiments of the present invention include modules having both inboard and outboard floats, onshore power stations, and various frame forms.

OBJECTS OF THE INVENTION

It is, therefore, a main object of the present invention to make full use of each wave in a given wave front to generate fluid flow which is translated into usable power.

It is another object of the present invention to use both upward and downward movement of a float located in a body of water which has wave movement therein.

It is yet a further object of the present invention to provide a wave power system having an adjustable size.

It is still another object of the present invention to provide a wave power device which is supportable on floats located in a body of water.

It is yet another object of the present invention to provide a system which orients itself about a power station according to both wave and wind force factors.

It is still a further object of the present invention to multiply the force generated by movement of a float in a wave system to fully utilize the wave movement without producing a large device which is susceptible to damage and/or breakup.

DESCRIPTION OF THE INVENTION

DETAILED DESCRIPTION OF THE PREFERRED EMBODIMENT

Figure 1A:
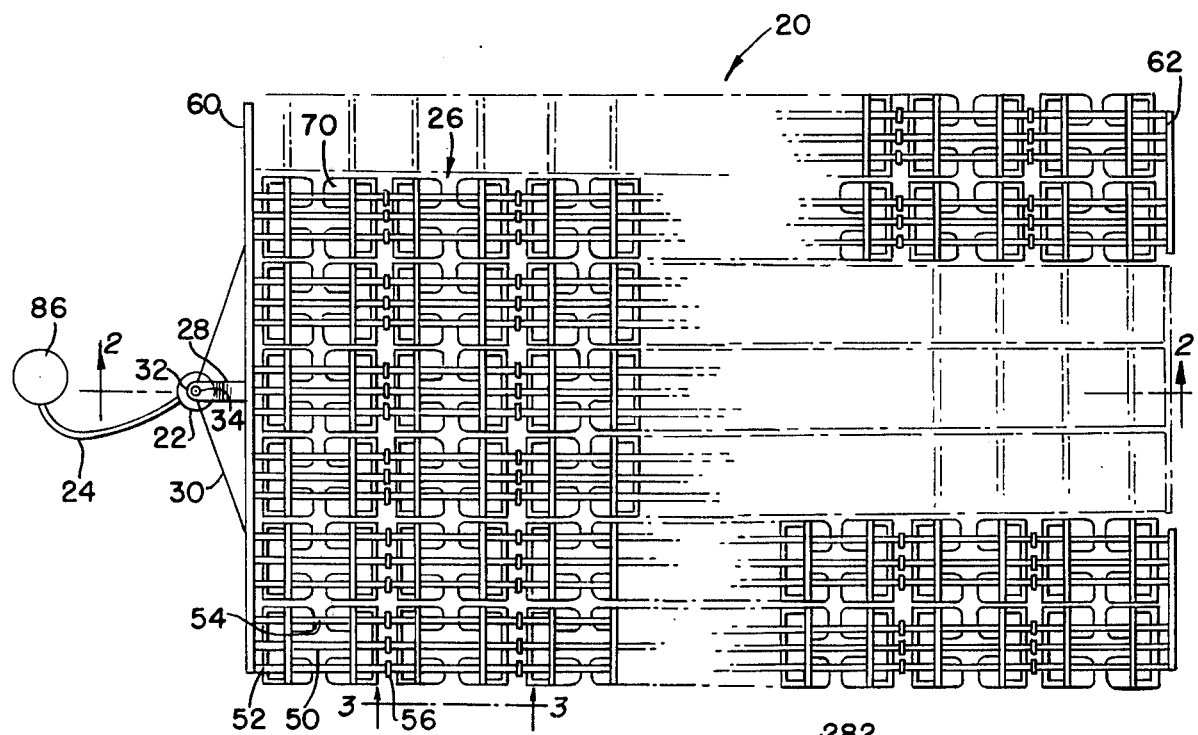
FIG. 1A shows an overall plan view of a device comprising a plurality of power producing modules in accordance with the teachings of the present invention.

Shown in FIG. 1A is a device for generating power using the motion of water waves. The device is generally indicated by the reference numeral 20, and comprises a power station, such as offshore power station 22 which transmits power through a cable 24 to devices located on shore or inland for usage thereby. The power station 22 comprises devices, such as fluid motors, for translating work generated by the flow of hydraulic fluid into usable electric power.

Figure 2:
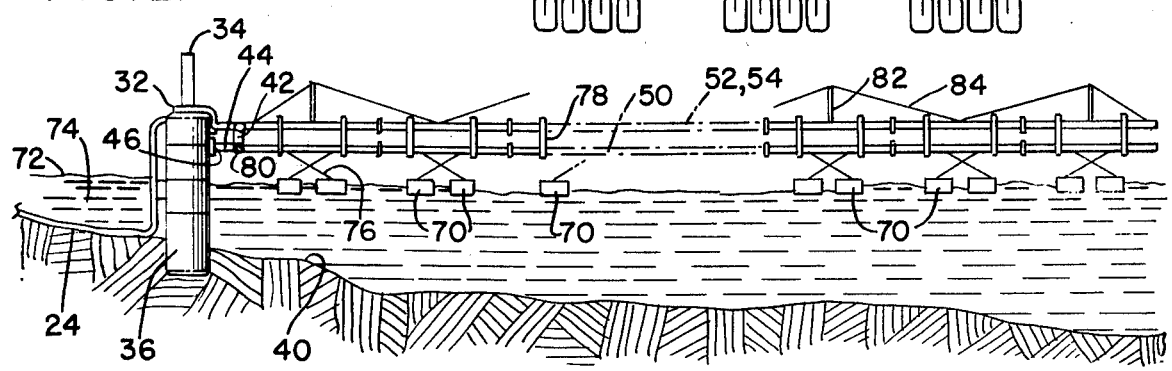
FIG. 2 shows an elevation view of the device shown in FIG. 1A.

A plurality of modules 26 are connected together to form a flotilla and are movably connected to the power station 22 by a coupling means 28 and cables 30. As shown in FIG. 2, the coupling means 28 comprises a collar 32 pivotally connected to a pivot riser 34 of the power station 22 which comprises a central anchor 36 mounted in a sea bed or ocean floor 40. The coupling means 28 further includes a brace 42 and a lower leg 44 abutting the outside of center anchor 36 with a shoe 46. The modules are therefore anchored in the ocean floor away from a mainland and can rotate around the center anchor 36 depending on the direction of wave action and wind force vectors. Since wave direction and wind direction do not always coincide, by moving around a center point defined by pivot riser 34, the system of modules 26 is prevented from being oriented in a position wherein stresses created by wind force vectors may cause damage or breakup of the flotilla or of the individual modules. The necessary hydraulic motors, turbines, and the like could be located in the center anchor 36 and thus provide a solid anchor point for the system of modules 26. Furthermore, by moving about the center anchor 36, the system of modules works with the wind rather than against it.

As shown in FIG. 1A and 2, the modules 26 each comprise a plurality of pipes, including a high pressure line 50 and return lines 52 and 54. In the preferred embodiment, the return lines are somewhat larger in diameter than the high pressure line. The pipes of each module are connected to the corresponding pipes of the next adjacent module by connecting means 56, and are fluidly connected to a forward header 60 and a rear header 62, with cables 30 being attached to forward header 60. A plurality of floats 70 are located subadjacent the hydraulic pipelines and serve to support the modules 26 above the surface 72 of the water 74. Connecting rods 76 mounted on elements of frame sections associated with the modules connect the floats to the modules.

The pipes are outerconnected by connecting members 56, vertical brace members 78 of the frame elements, and by the brace 42 which can either be a solid member or a hollow member to serve as the forward header 60 and is connected to the hydraulic pipelines by suitable means such as pins 80.

Masts 82 are supported above the hydraulic pipelines by cables 84 attached to the pipelines. Furthermore, a surge tank 8 or other suitable hydraulic accumulator means, can be used to control the hydraulic pressure of the fluid in the pipelines, and any suitable hydraulic fluid, such as oil, can be used with the device 20.

Figure 3:
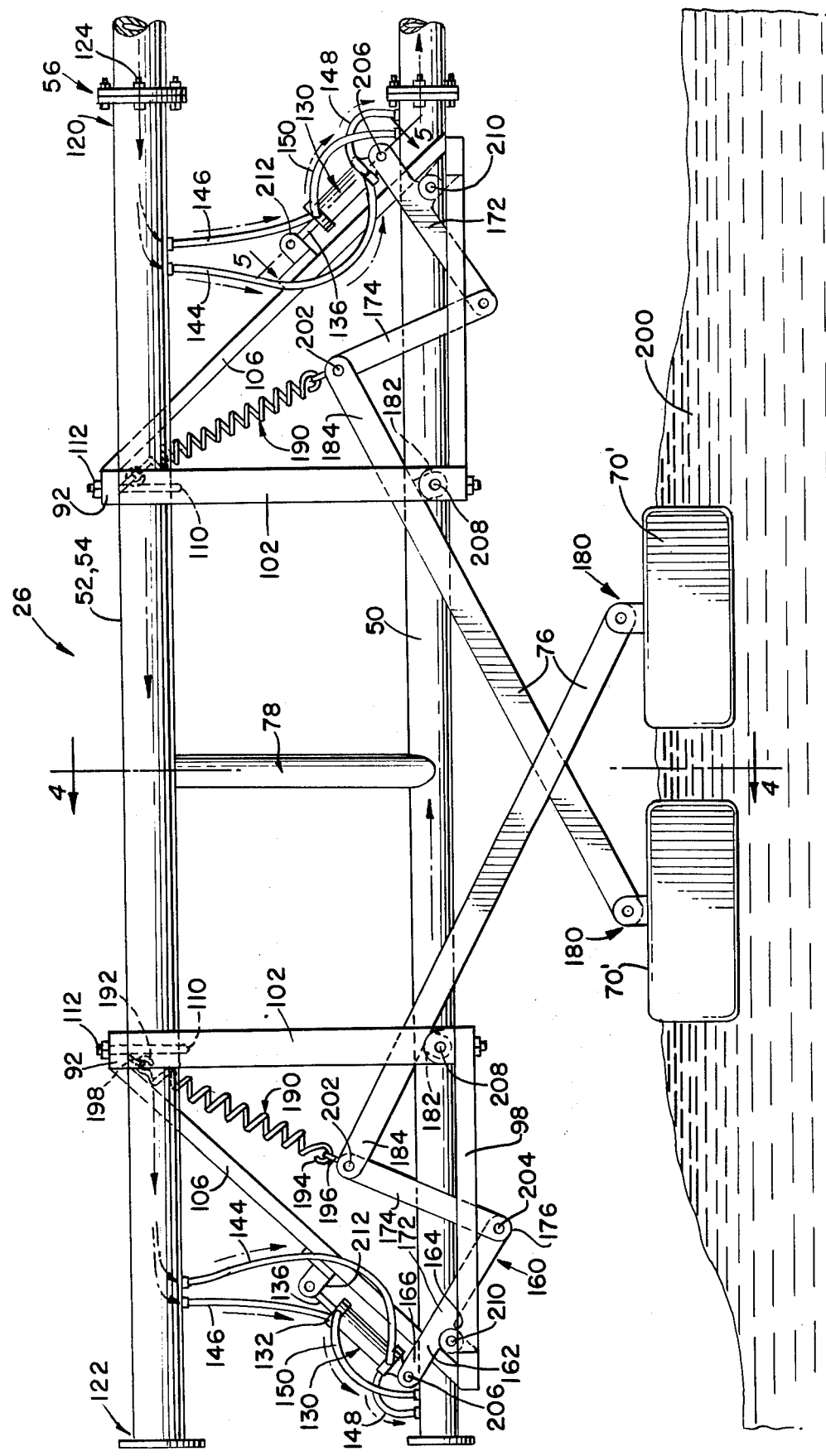
FIG. 3 shows a detailed elevation view of one of the power modules utilized in the device embodying the present invention.
Figure 4:
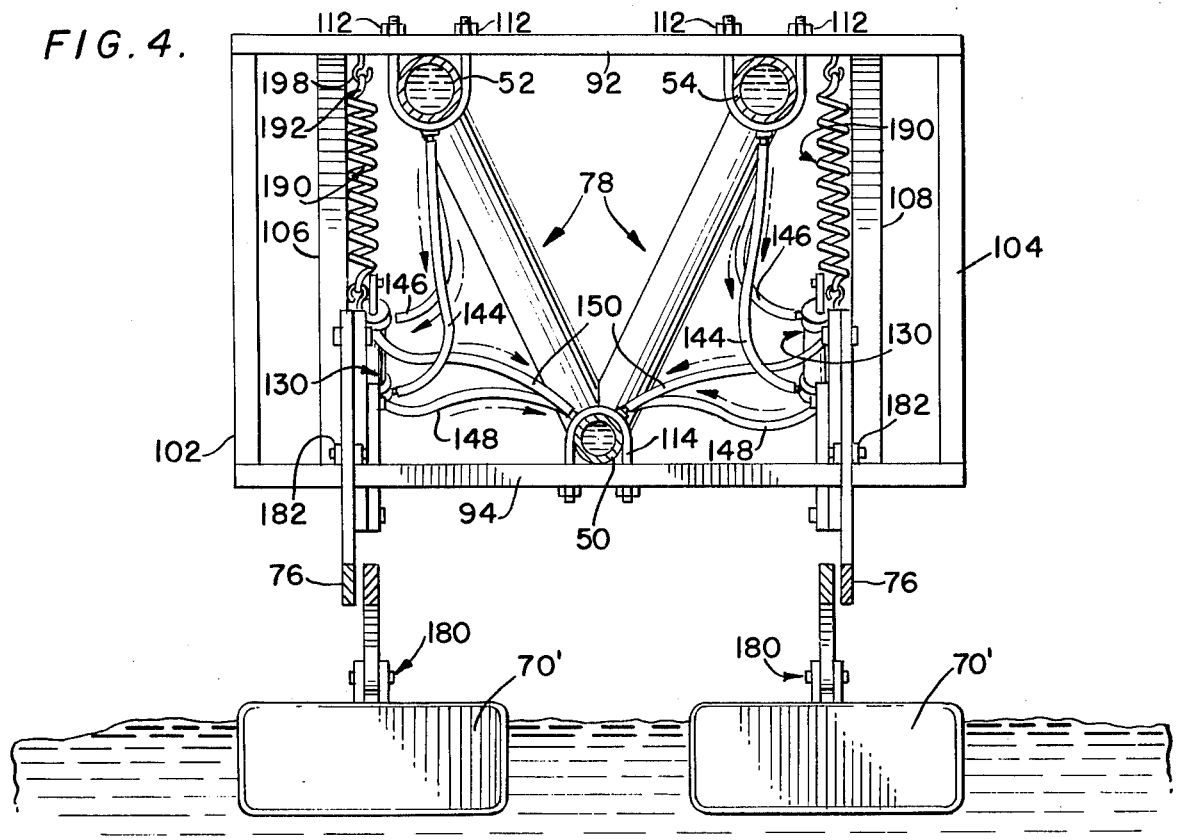
FIG. 4 shows an end view of the module shown in FIG. 3.
Figure 6:
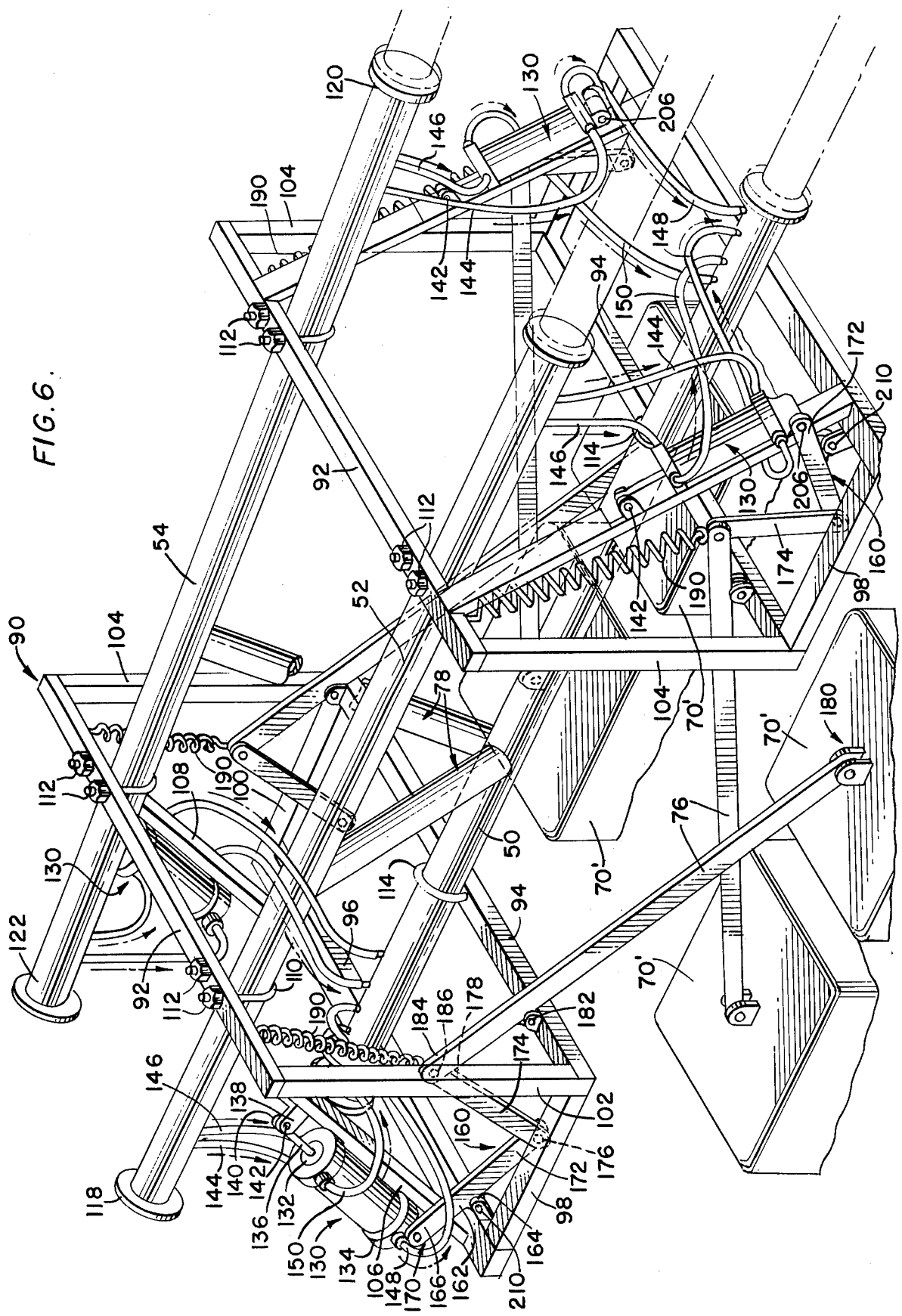
FIG. 6 shows a perspective view of a module used in the device embodying the teachings of the present invention.

FIGS. 3, 4 and 6 show views of one of the modules 26. As shown in FIGS. 3 and 6, each module comprises a triangular frame section 90 having horizontal elements 92, 94 and 96, with elements 94 and 96 being connected by horizontal elements 98 and 100. The horizontal elements 92 and 94 are connected by vertical elements 102 and 104 and by hypotenuse members 106 and 108. The return pipes 52 and 54 are connected to horizontal element 92 by U-bolts 110 bolted to the horizontal frame element 92 by nuts 112 and high pressure pipe 50 is attached to horizontal frame element 94 and by U-bolt 114. As shown in FIGS. 3 and 6, the connecting member 56 is comprises of flanges 118 located on ends 120 and 122 of the pipes 50, 52 and 54. The flanges have holes for receiving bolts 124 to attach the flanges of the pipes in one section to the flanges of pipes in an adjacent section. The vertical brace member 78 is comprised of two legs, each welded to pipes 50, 52 and 54 to form a triangular configuration and thereby support the pipes in a secure and stable manner.

As shown, the device comprises two return pipes for each high pressure pipe, however, other combinations are possible and depend only on the rate of flow and pressure desired in the hydraulic pipes. The pipes are connected to headers 60 and 62 for conducting the hydraulic fluid to and from the power station 22.

Attached to each of the hypotenuse elements of each triangular frame 90 is a double-acting pump 130 comprising end caps 132 and 134 and a piston rod 136 pivotally connected to a mounting means 138 by a yoke connection 140 comprising a pivot pin 142. Fluid lines, including inlet fluid lines 144 and 146, and outlet fluid lines 148 and 150 are connected to the pump 130 at the end caps thereof, and are connected to the hydraulic fluid pipes 50, 52 and 54 so that the pumps 130 can displace fluid through the hydraulic pipes to and from the power station 22. The mounting means 138 are fixedly attached to the hypotenuse members 106 and pump casing 151, (FIG. 5) comprising end caps 132 and 134 is free to move. Thus, positive displacement of the fluid through the double-acting pump 130 occurs when the casing 151 is reciprocated on the piston, and displacement occurs twice for each cycle of the double-acting pump 130.

A two-arm linkage 160 rotates to actuate the pump. The two-arm linkage comprises a first arm 162 pivotally connected to horizontal frame element 96 by pivotal connecting means 164 and having one end 166 pivotally attached to end cap 134 by yoke connection 170. The other end 172 of the arm 162 is connected to arm 174 by pivot pin 176. Thus, movement of end 178 of arm 174 causes arm 162 to pivot about a fulcrum comprised of mounting 164 and causes end 166 to actuate the pump 130.

As shown in FIGS. 3 and 6, there are a plurality of floats 70 associated with each of the modules 26. A connecting rod 76 is pivotally connected to each of the floats by a connecting means 180 and is mounted on horizontal frame element 94 by a mounting means 182. The connecting rod 76 is connected at end 184 to arm 174 of the two-arm linkage 160 by a pin 186. Therefore, up and down movement of the float 70' is transferred to arm 174 of the linkage 160 and thereby translated into a reciprocating movement of the double-acting pump 130. A spring 190 is mounted at end 192 thereof to horizontal element 92 of the triangular frame section, and at end 194 thereof to end 184 of the connecting rod 76. Connecting means, such as hook members 196 and 198, can be used to connect the spring 190 to the connecting rod and the frame element, respectively.

In the preferred embodiment, the frame 90 is set up to obtain the maximum strength for a minimum weight of material. Furthermore, in the preferred embodiment, the leverage system comprising connecting rod 76 and two-arm linkage 160 is arranged for a mechanical advantage of 10:2 and 3:1 respectively, thus making a combined leverage of 15:1 between the force exerted on connecting rod 76 by the float 70' and the force exerted on double-acting pump 130 by end 166 of arm 162 of the two-arm linkage 160.

The spring 190 has a spring constant and is located on frame 90 so that the weight of float 70' is minimized. In the preferred embodiment, upward movement of float 70' tensions spring 190 so that downward movement of float 70' is assisted by the spring force exerted on end 178 of connecting rod 76. Therefore, the weight of the module is transferred via the springs to the connecting rods so that the module is supported above the water by the floats.

Thus, when a wave 200 passes by module 26, the float 70' first rises vertically upward thereby actuating the pump 130 in a first stroke via linkage 160 and connecting rod 76 while tensioning spring 190; then falls vertically downward. During the downward movement of float 70', the spring 190 pulls end 178 of the connecting rod 76 upward thereby assisting the downward movement of float 70' in actuating the pump 130 in a second stroke via linkage 160. The double-acting pump 130 therefore displaces fluid through lines 50, 52 and 52 twice for the cycle generated by each wave 200.

As shown in FIG. 3, the preferred embodiment therefore comprises free hinge points 202, 204 and 206; and fixed hinge points 208, 210 and 212.

Figure 5:
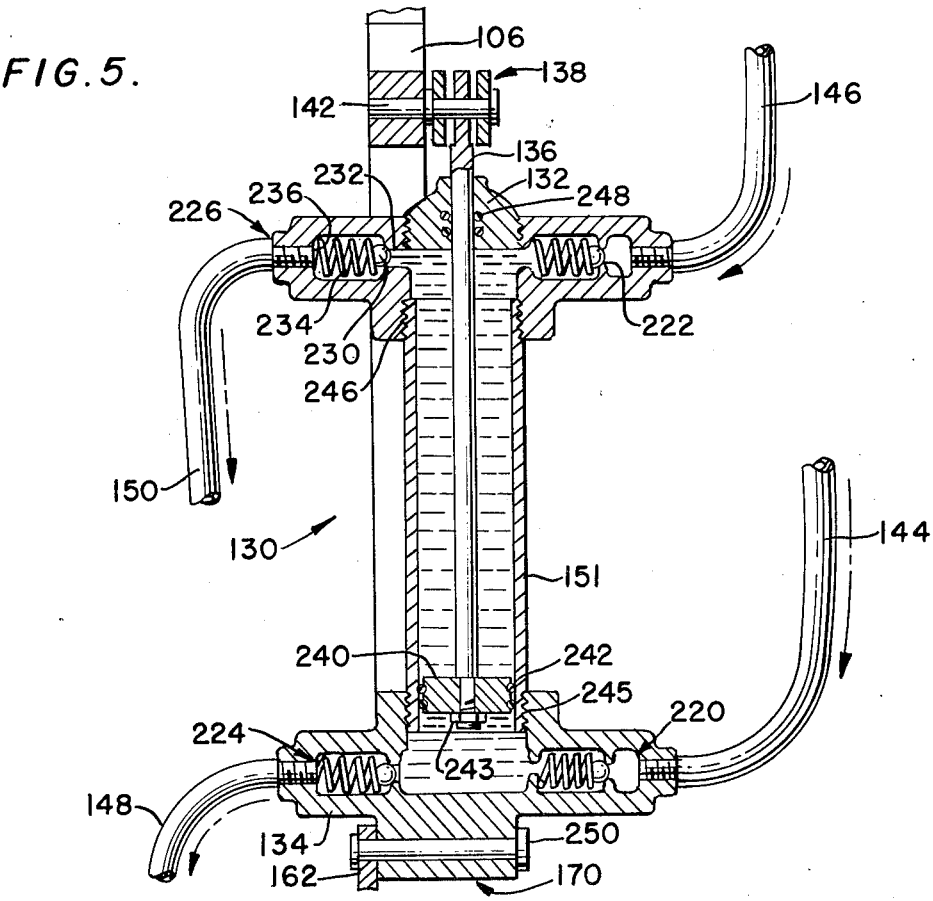
FIG. 5 shows a detailed cut-away view of a double-acting pump utilized by the device embodying the present invention.

The double-acting pump 130 is best shown in FIG. 5. As shown in FIG. 5, the double-acting pump 130 comprises check valves 220, 222, 224 and 226, each comprising a ball 230 biased into an inlet 232 by a spring 234. The check valves are located in the end caps 132 and 134, respectively, and each comprise an outlet 236. The check valves permit one way flow through the lines 146 and 144 into the pump and through lines 148 and 150 out of the pump. The piston of the pump comprises piston disc 240 having O-rings 242 thereon connected to piston rod 136 by nut 243 threaded onto a threaded connection of the piston rod. Casing 151 is threadably connected to end caps 132 and 134 by threads 245 and 246, respectively. O-ring seals 248 sealing engage the outer surface of the piston rod 136.

The piston rod 136 is connected to connecting means 138 by bolt 142 threading through an eye of the piston rod, and an anchor bolt 250 connects end cap 134 to end 166 of arm 162 of the two-arm linkage 160. Each of the check valves has an inlet arranged so that on an outward stroke, fluid is transferred from line 144 into the chamber of the piston below piston disc 240 while being displaced out of the chamber above the piston 240 through line 150. The downward stroke then displaces fluid out of the chamber below piston disc 240 out of line 148 and into the chamber above piston disc 240 through line 146 to complete the cycle. The design of the pump 130 is of a nature that is the least expensive to manufacture, and can be disassembled for easy replacement of the parts thereof.

Figure 7:
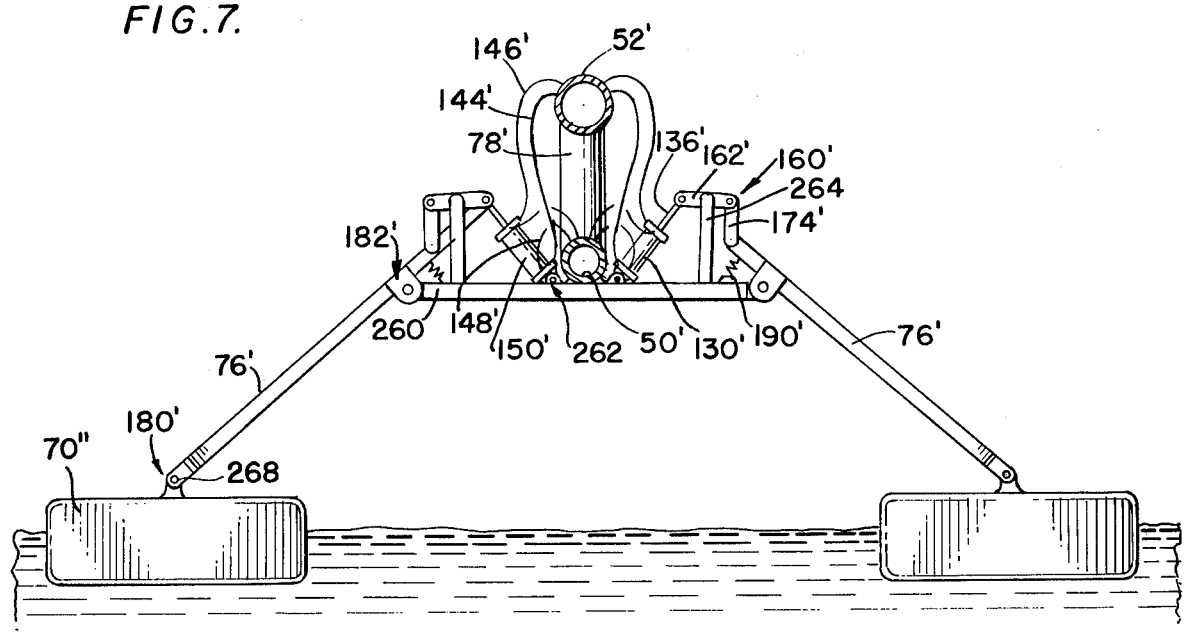
FIG. 7 shows an elevation view of an alternative embodiment of the energy transfer device embodying the present invention.
Figure 8:
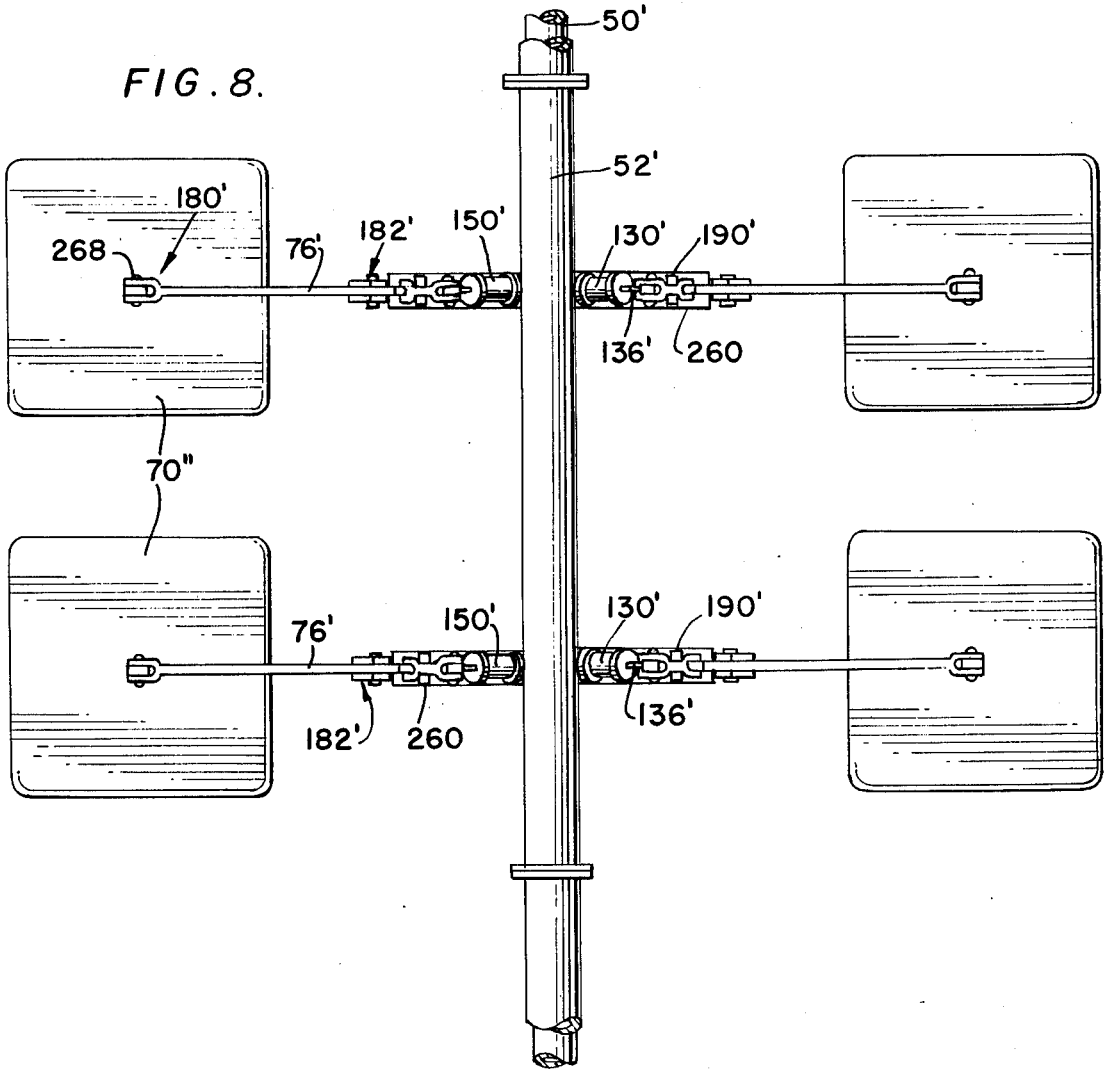
FIG. 8 shows a plan view of the FIG. 7 embodiment of the present invention.

FIGS. 7 and 8 show an alternative embodiment of the module 26. As shown in FIG. 7, float 7'' is connected to a connecting rod 76' by connecting means 180'. The connecting rod 76' is pivotally connected to a crossbrace 260 by pivotal connection 182' and to arm 174' of two-arm linkage 160'. A second arm 162' is connected to arm 174' and to piston rod 136' of double-acting pump 130. The pump casing 150' is pivotally connected to the crossbrace 260 by pivotal connecting means 262, the spring 190' is connected to connecting rod 76' and to crossbrace 260. The arm 162' is connected to crossbrace 262 by connecting link 264, and hydraulic lines 144', 146', 148' and 150' fluidly connect the pump 130' to a pressure line 50' and a return line 52'. A vertical brace member 78' connects the pressure line and the return line together and thus supports the structure in the configuration shown in FIG. 7. Connecting means 56' allow connection of the pipes in each module to those pipes in adjacent modules and to the header 60 and 62.

As shown in FIG. 8, connection 180' can be a yoke connection comprising a pin 268, similar to connection 180 in the preferred embodiment.

Figure 1B:
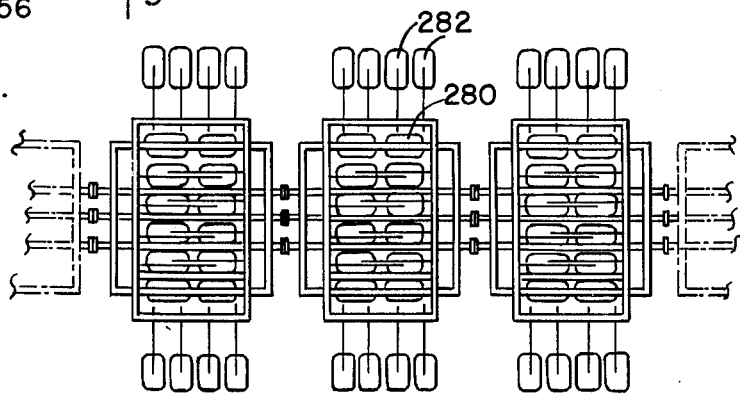
FIG. 1B shows a plan view of an alternative form of the device embodying the teachings of the present invention.

A further alternative form of the present invention is shown in FIG. 1B wherein the modules 26 each comprise inboard floats 280 and outboard floats 282. The outboard floats 282 can be connected to separate double-acting pumps such as pump 130 shown in FIGS. 3 and 6 via connecting arms and two linkages similar to connecting arm 76 and linkage 168, respectively, or can be connected to double-acting pumps via connecting rods similar to connecting rods 76' and two-arm linkage similar to two-arm linkage 160' shown in FIG. 7. A further alternative form could include the outboard floats connected to the double-acting pumps to which the inboard floats are connected, thereby increasing the pressure exerted by these pumps on the fluid in the system. In any case, the connection between the floats 282 and the respective double-acting pumps is via a connecting rod and two-arm linkage with a spring to assist operation of the pump on a return movement of the float after an initial movement biases the spring accordingly.

As shown in FIG. 7, the pump casing is fixed and the pump piston is operated by the connecting rods, however, a reverse connection, such as that used in the preferred embodiment can also be used.

Figure 9:
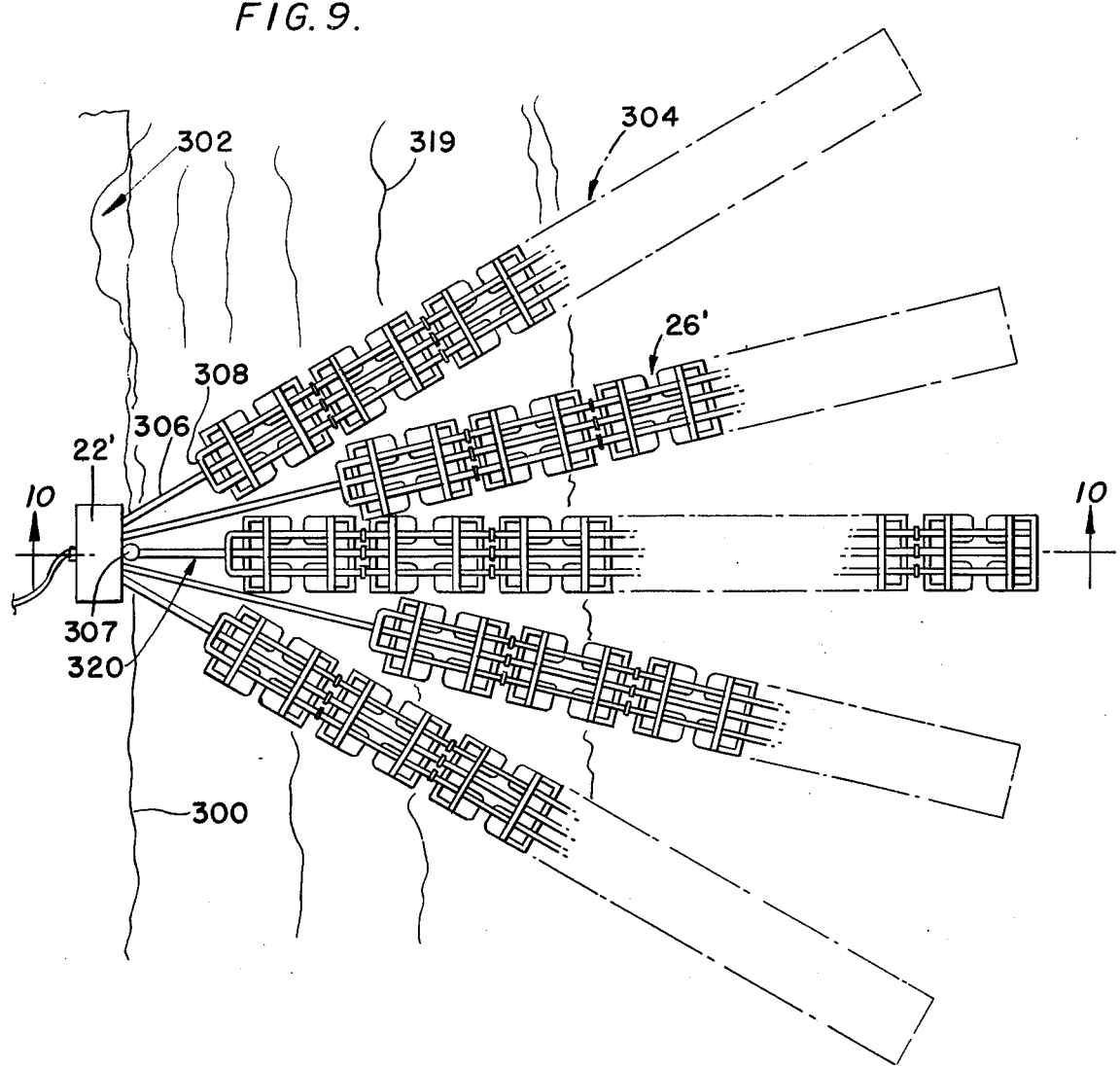
FIG. 9 shows a plan view of an alternative embodiment of the present invention having an onshore power station and a plurality of power modules connected thereto.
Figure 10:
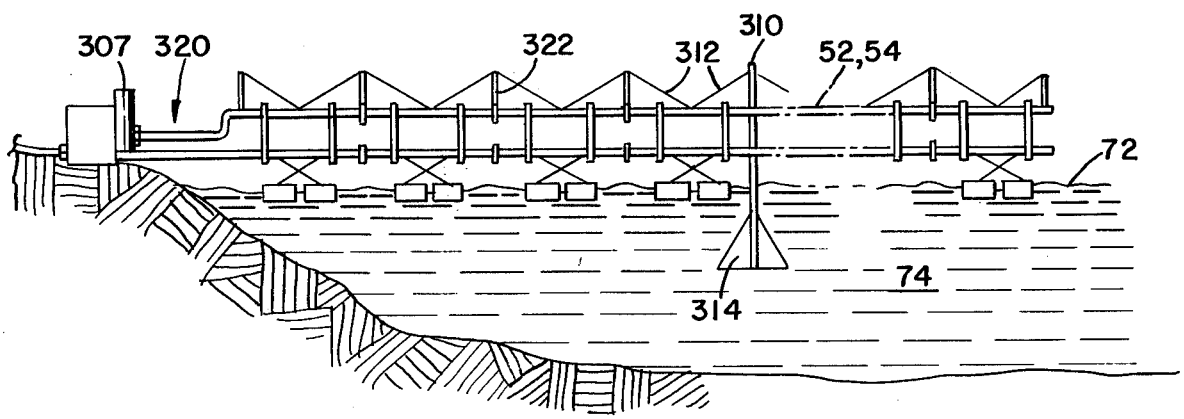
FIG. 10 shows an elevation view of the FIG. 9 embodiment of the present invention.

A further alternative form of the present invention is shown in FIGS. 9 and 10 wherein a power station 22' is located adjacent a bank 300 of a shore 302. As shown in FIG. 9, the modules 26' are similar to the modules 26 of the preferred embodiment, but are connected to form individual spokes 304 rather than a single flotilla, such as shown in FIG. 1. The individual spokes 304 are each connected to the power station 22' by a connecting pipe 306 attached to a header 308 of each spoke. A central connection means 307 is also shown. As shown in FIG. 10, each of the spokes comprises at least one central mast 310 connected by cable supports 312 to the hydraulic pipe lines 52 and 54 and to a thrust fin 314 located beneath water surface 72 of the water 74.

The power station 22' is set on bank 300 at a point where large and continuous wave action is present. The waves are represented by reference numeral 319. As shown in FIG. 10, the return lines 52 and 54 are connected to pressure line 50 by brace members 78'' to form a rigid backbone 320. The cable supports 312 provide support to the backbone 320 and to the central mast 310, as well as the local masts 322 associated with each of the modules 26'. The thrust fin 314 is located a considerable distance below water surface 72 and helps to keep the central mast 310 and the backbone 320 in a vertical position against the tipping and rolling action of the waves 319.

The operation of the device 20 is very efficient. After locating the power station 22, the modules are towed out to sea and connected together and to the headers 62 and 64, and to the power station 22. The surge tank and pipelines are filled with hydraulic fluid, and air is then let out of the system.

As waves move across the float area, the floats rise and fall delivering oil at high pressure to the hydraulic equipment in the power station 22. After having performed work on the power station 22, the hydraulic fluid is moved into the surge tank, and from there back into either header 60 or header 62 of the flotilla of modules 26. The cycle is then repeated. The hydraulic fluid is moved through the system as was described above by the action of double-acting pumps 130 associated with each of the modules 26 according to the movement of the floats and the springs associated with each of the frame sections of the modules.

A further embodiment of the present invention comprises a plurality of modules located several feet under the water surface 72 so that the floats also become surf breakers as well as high pressure fluid suppliers. In this embodiment, small boats can pass through the float field at low speed without damage to the boat, or to the floats. In this embodiment, the elements of the device 20 would be constructed of a corrosion resistant material.

The device 20 as well as the alternative form thereof described above, can be sized to provide any suitable amount of power. Therefore, the device can be used to provide power in such small amounts as are required by single homes, or in such large amounts as are required by large populated areas.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. An apparatus for converting the movement of waves in a body of water into power, comprising:
    a power station which generates power as a result of fluid flowing therethrough;
    a plurality of frame sections each including a plurality of pipes connected to pipes of adjacent frame sections and to said power station for conducting fluid to and from said power station, a double-acting pump attached to said frame section and fluidly connected to said pipes so that actuation of said double-acting pump causes fluid to be moved through said pipes, and linkage means pivotally mounted on said frame section and connected to said double-acting pump in a manner such that movement of said linkage actuates said double-acting pump;
    a float located in the water, said float undergoing upward and downward movement in accordance with the movement of waves in the water;
    a connecting rod pivotally mounted on said frame section and attached to said float for connecting said float to said frame section, said connecting rod being pivotally connected to said linkage so that said float upward and downward movement is transmitted to said double-acting pump via said connecting rod and said linkage through a mechanical advantage to actuate said double-acting pump; and
    spring means connected to said connecting rod and to said frame so that said frame section is supported by said float and movement of said float in one direction deforms said spring to bias same in a manner such that during movement of said float in an opposite direction, movement of said connecting rod is assisted by said spring so that movement of said linkage by said connecting rod is assisted by said spring whereby said spring assists said connecting rod in actuating said pump via said linkage during movement of said float in said opposite vertical direction.

2. The apparatus defined in claim 1 wherein said float is located subadjacent said frame section and said frame section is supported above the water by said float.

3. The apparatus defined in claim 2 wherein said power station is connected to said pipes in a manner such that orientation of said plurality of frame sections with respect to said power station is effected according to wind and wave forces exerted on said frame sections.

4. The apparatus defined in claim 3 wherein said spring is tensioned by float movement in said one vertical direction.

5. The apparatus defined in claim 4 wherein said linkage comprises one arm connected to said double-acting pump and another arm connected to said one arm and to said connecting rod.

6. The apparatus defined in claim 5 wherein said double-acting pump includes a housing movably mounted on said frame section and a piston pivotally fixed to said frame section, and wherein said linkage one arm is connected to said pump housing.

7. The apparatus defined in claim 6 further including a triangular brace member connecting said pipes together.

8. The apparatus defined in claim 7 further including a plurality of floats including inboard floats located directly subadjacent said frame section.

9. The apparatus defined in claim 8 further including a plurality of outboard floats connected to said frame section and spaced from said inboard floats.

10. The apparatus defined in claim 9 further including a mast connected to said frame section by cables.

11. The apparatus defined in claim 10 further including a crossbrace on which said pipes and said connecting rod are mounted.

12. The apparatus defined in claim 1 wherein said double-acting pump comprises a housing attached to said frame section, and a piston pivotally connected to said linkage in a manner such that upward and downward movement of said float is transmitted to said double-acting pump piston via said connecting rod and said linkage through a mechanical advantage associated therewith to move same and thereby actuate said double-acting pump.

13. The apparatus defined in claim 12 wherein said power station includes an offshore center anchor located at sea and spaced from a shoreline.

14. The apparatus of claim 1 wherein said power station includes an on-shore power station located adjacent the water on dry land.

15. The apparatus of claim 14 further including a central mast connected to said pipes by cables and a thrust fin connected to said central mast and located beneath the surface of the water.

16. The apparatus defined in claim 8 wherein said plurality of frame sections are connected together to form a flotilla.

17. The apparatus defined in claim 15 further including a plurality of frame sections connected together to form a plurality of spokes radiating from a central point with said power station being located at said central point.

18. The apparatus of claim 1 wherein said frame sections are located beneath the surface of the water and said floats are positioned above said frame sections.

19. The apparatus of claim 18 wherein each frame section further includes a plurality of floats including inboard floats located directly superadjacent said each frame section.

20. The apparatus of claim 19 wherein each frame section further includes a plurality of outboard floats connected to said frame section and spaced from said inboard floats.

* * * * *